Figure 1:
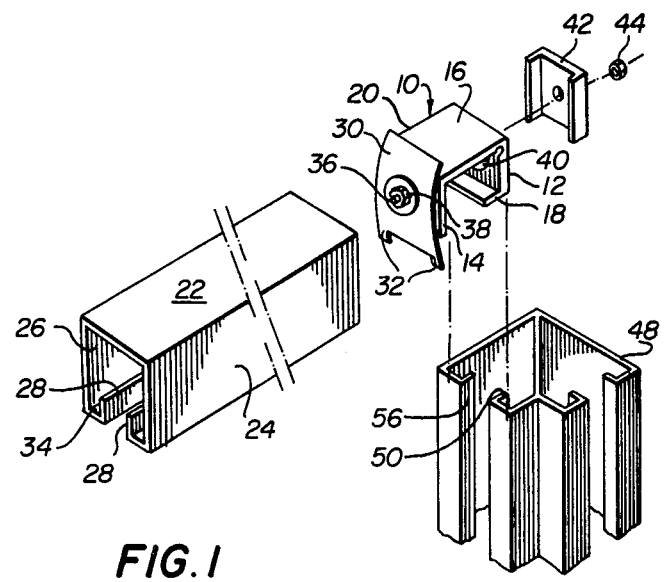

United States Patent [19]  [11] 4,101,226
Parisien  [45] Jul. 18, 1978

[54] FENCE RAIL FASTENER

[76] Inventor: Rudolph E. Parisien, 891 Rainbow St., Ottawa, Canada

[21] Appl. No.: 800,076

[22] Filed: May 24, 1977

[30] Foreign Application Priority Data

May 31, 1976 [CA] Canada .................................. 253756

[51] Int. Cl.² ................................................ F16B 2/02
[52] U.S. Cl. ........................................ 403/4; 403/187; 403/262; 256/21; 256/65
[58] Field of Search ............... 403/262, 264, 187, 230, 403/231, 4; 256/68, 69, 65, 22, 21, 59

[56] References Cited

U.S. PATENT DOCUMENTS

| 2,932,488 | 4/1960 | Dotson | 256/21 |
| 3,031,217 | 4/1962 | Tinnerman | 403/187 |
| 3,529,808 | 9/1970 | Siebers | 403/264 |
| 3,592,493 | 7/1971 | Goose | 403/264 |
| 3,772,837 | 11/1973 | Hunt | 256/65 |

Primary Examiner—Andrew V. Kundrat
Attorney, Agent, or Firm—A. W. Breiner

[57] ABSTRACT

A bracket for supporting a channel type fence rail which abuts a side wall of a channel type corner post or terminal post. The bracket is in the form of a channel having two side walls and an interconnecting wall the height and width of which are such that the bracket is received in an open end of the fence rail. A curved sheet metal member is secured to one side wall of the bracket so that its edges engage the walls in the interior of the rail. The bracket is secured to the post by a bolt which passes through the other side wall of the bracket, through the slot in the post and a washer in the channel. A nut on the bolt serves to hold the bracket tightly against the post. The bracket is fastened to the rail by flattening the curved member. This is accomplished either by tightening the means fastening the sheet metal member or by the movement of the bracket toward the open end of the rail due to the tightening of the bolt securing the bracket to the post.

4 Claims, 4 Drawing Figures

U.S. Patent   July 18, 1978   Sheet 1 of 2   4,101,226

FENCE RAIL FASTENER

This invention relates to fastening devices and more particularly to a bracket for fastening a top rail of a fence to a post so that the end of the rail abuts the side of the post.

Various methods used in the past to fasten top rails of fences to terminal posts including flanges on posts or rails, bolts, welding, sheet metal screws or the like require either that the fence rails be precut in the factory or that special tools such as power drills or welders be moved to the job site, thereby greatly increasing the cost of the fence.

Furthermore the prior methods failed to provide a fastener which will lock the rail in place and which provides concealed fastening means.

The present invention is primarily for use with posts and rails comprising channel members the side walls of which are bent inwardly to provide a restricted opening therebetween. Ordinarily the end of the top rail is received on a right angle bracket bolted to the corner post or terminal post. However, fencing consisting of upright slats or the like does not provide any means to hold the ends of the top rails against the upright post.

It is therefore an object of the present invention to provide an economical combination support bracket and locking device for securing rails to posts.

A further object of the present invention is the provision of a support bracket having concealed fastening means.

A still further object is the provision of a bracket which will adjust to receive top rails disposed at angles other than 90°.

Accordingly the present invention provides a bracket for use in fastening a fence rail to a fence post so that the end of the rail abuts a side of the post, the rail and the post being in the form of channel members having spaced apart side walls and an interconnecting wall, the side walls being bent inwardly to define a slot therebetween, the bracket comprising a channel member having two side walls and an interconnecting wall, a first one of the walls being bent toward a second one of the walls so as to provide a partial wall substantially parallel to the connecting wall, adjustable attaching means on the first wall for engaging the post and a curved sheet metal member, at least one major dimension of which is greater than an interior dimension of the rail, secured to said second side wall at an outer face thereof, whereby when said bracket is inserted into the rail so that the first wall thereof is adjacent but spaced from an end of the rail and the first wall is then secured to the post by the adjustable means in such a manner that movement of at least a central portion of the sheet metal member causes the curved sheet metal member to flatten and consequently edges of the sheet metal member are wedged against inner walls of the rail.

Figure 2:
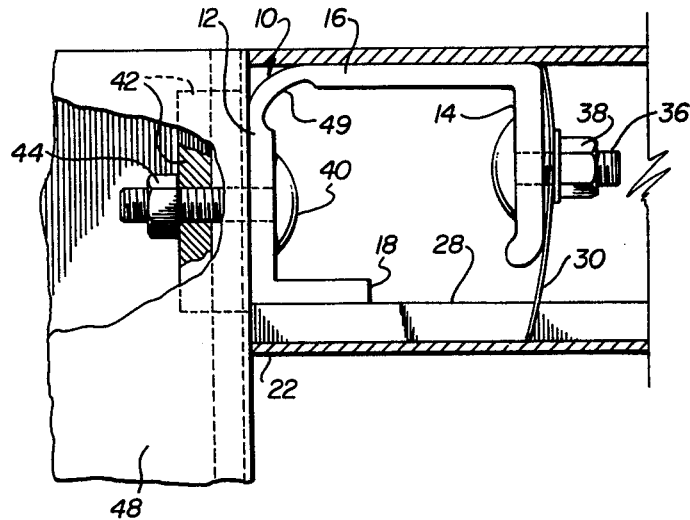
Figure 3:
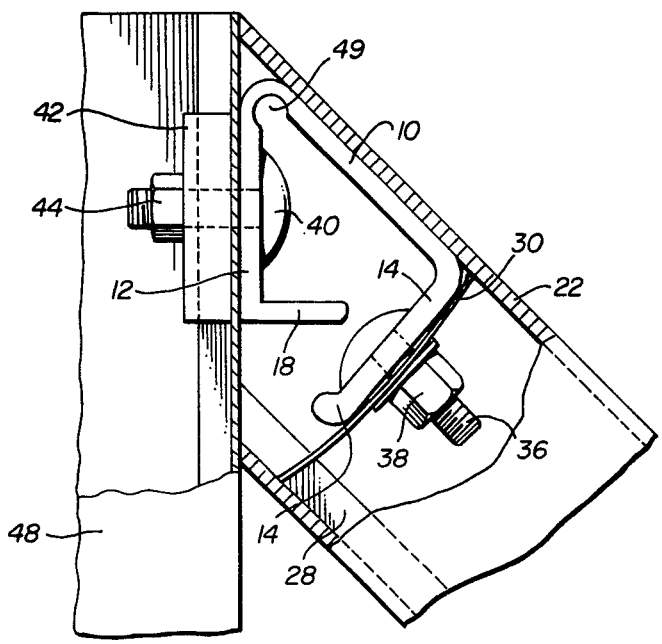
Figure 4:
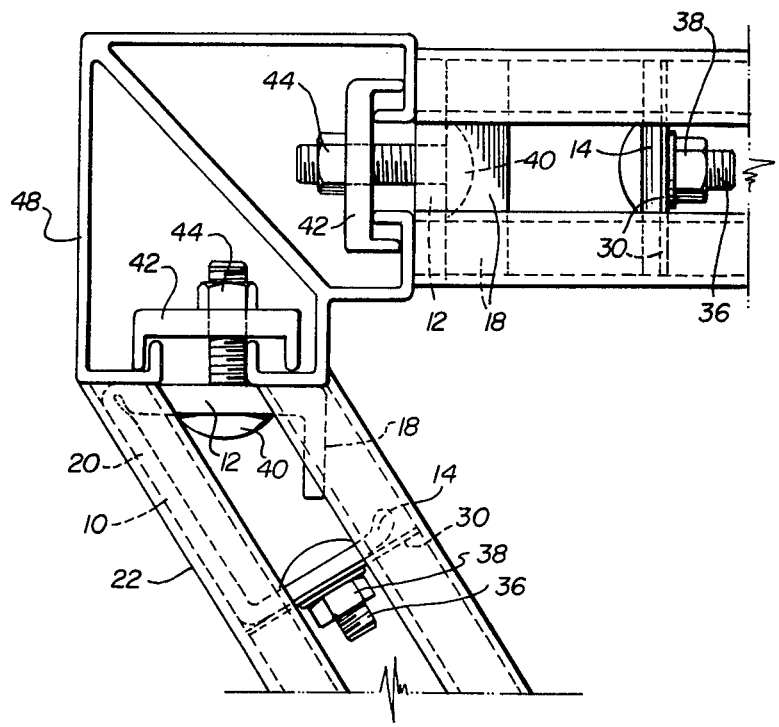

In the accompanying drawings which illustrate embodiments of the invention,

FIG. 1 is an exploded perspective view of the bracket of this invention together with a fence post and fence rail, FIG. 2 is a side elevational view of the bracket in use securing a fence rail to a corner post, FIG. 3 is a side elevational view showing the bracket with a rail which abuts the corner post at an angle of 45° and FIG. 4 is a bottom plan view of a rail which abuts the corner post at an angle of 45°.

Referring now in detail to the drawings a bracket shown generally at 10 in FIG. 1 is conveniently formed of aluminum alloy by extrusion. The bracket 10 is in the form of a channel member having first and second side walls 12 and 14 and an interconnecting wall 16. The side wall 12 has its outer edge bent inwardly to provide a partial wall 18. The length of the channel member forming the body 20 of the bracket 10 is substantially equal to the height of the first wall 12 so that the wall 12 is square. The height of the first wall 12 is such that the body can be received in an open end of a fence rail 22. The fence rail 22 has side walls 24 and 26 which are bent inwardly and upwardly to provide ribs 28 defining a slot therebetween. These ribs 28 contact the partial wall 18 of the bracket to restrict upward movement of the rail 22. The partial wall 18 merely provides a greater bearing surface for the lower wall of the rail 22 or the top wall as shown in FIG. 4.

Fastening the bracket 10 in the rail 22 is accomplished by providing a curved sheet metal member 30 which is shaped to conform with the interior dimensions of the rail. The sheet metal member is substantially rectangular and has two tabs 32 which are received in grooves 34 between the ribs 28 and the side walls 24 and 26. The member 30 is formed of spring steel or the like and has a centrally located aperture to receive a bolt 36. The bolt 36 extends through an aperture in the second or front wall 14 of the bracket 10. A nut 38 is provided on the bolt 36. The first wall 12 of the bracket 10 is also provided with an aperture through which a bolt 40 extends so as to pass through a special channel type washer 42. A nut 44 adapted to be received on the end of the bolt 40 retains the washer 42 on the bolt 40 as shown in FIG. 2.

It should be pointed out that the body of the bracket 10 has an internal line of weakening at the junction of the interconnecting wall 16 and the side wall 12 the purpose of which will be described below with reference to FIG. 3.

It will also be noted that the corner post 48 as shown in FIGS. 1 and 3 has a pair of channels each of which has sidewalls bent inwardly to define a slot therebetween and a pair of ribs 50 similar to ribs 28 on the rail 22. The ribs 50 are engaged by the channel washer 42.

In use the bracket 10 is assembled with the sheet metal member 30 secured to the wall 14 of the bracket 10. It is possible to adjust the curvature of the sheet metal member 30 by tightening or loosening the nut 38 on the bolt 36 thus causing it to expand or contract to fit the opening in the rail 22. The bolt 40, the channel washer 42 and the nut 44 are also assembled on the bracket 10 allowing a space between the washer 42 and the wall 12 of the bracket 10.

The bracket 10 is then slid into the end of rail 22 so that the wall 12 is inside the channel member 22 and approximately ⅛ of an inch from the end edge thereof. The nut 38 is then tightened using a flexible drive socket wrench thus flattening the sheet metal member 30. The rail 22 is then lifted into place so that the bolt 40 and the channel washer 42 can be slid into the post from the open upper end thereof. When the rail is in position the nut 44 is tightened by inserting a wrench through the open upper end of the post 48. The bolt 40 should be of the type known as a carriage bolt to co-operate with a square apperture in the wall 12 which will prevent the bolt from turning with the nut 44.

Due to the fact that the bracket 10 is moved toward the post 48 as the nut 44 is tightened the curved sheet metal member 30 will be further distorted. This flattening of the member 30 by tightening of the nuts 38 and 44 causes it to increase its length so as to grip the walls of the rail 22.

In the event that situations such as sloping ground require that the rail 22 abuts the corner post at an angle of other than 90° it is possible to bend the bracket 10 as shown in FIG. 3. The wall 12 has a line of weakening 49 which facilitates bending the wall so that it will engage the post whereas the wall 14 and the curved sheet metal member 30 will be substantially at right angles to the rail 22.

As shown in FIG. 4 the bracket 10 may also be turned through 90° so that side edges of the body 20 support the rail 22 when a rail 22 abuts the corner post 48 at an angle of other than 90°. The wall 12 is bent along the line of weakening to the required angle to engage the post 48 and the curved sheet metal member is turned so that the tabs 32 will be received in the grooves 34. The bracket is then inserted in the rail 22 and secured to the post 48 in much the same manner as that discribed above with reference to FIG. 2.

The embodiment of the invention in which an exclusive property or privilege is claimed are defined as follows:

1. A bracket for use in fastening a fence rail to a fence post so that the end of said rail abuts a side of said post, said rail and said post being in the form of channel members having spaced apart side walls and an interconnecting wall, said side walls being bent inwardly to define a slot therebetween, said bracket comprising a channel type member having two side walls and an interconnecting side wall, a first one of said side walls being bent toward a second one of said side walls so as to provide a partial wall substantially parallel to said connecting wall, adjustable attaching means on said first side wall for engaging said post and a curved sheet metal member, at least one major dimension of which is greater than an interior dimension of said rail, secured to said second side wall at an outer face thereof, whereby when said bracket is inserted into said rail so that said first wall thereof is adjacent but spaced from an end of said rail and said first wall is then secured to said post by said adjustable means in such a manner that movement of at least a cental portion of the sheet metal member causes said curved sheet metal member to flatten and consequently edges of said sheet metal member are wedged against inner walls of said rail.

2. A bracket as claimed in claim 1 wherein said curved sheet metal member is secured to said outer face of said side wall by adjustable means.

3. A bracket as claimed in claim 1 wherein a line of weakening is provided where said interconnecting wall joins said first wall so as to facilitate bending said bracket for use with rail which abut said post at an angle of other than 90°.

4. A bracket as claimed in claim 1 wherein said first wall is substantially square to facilitate use of said bracket when turned through 90° so that side edges of said bracket support said rail.

* * * * *